C. R. Morehouse,
Jaw Trap,
N° 34,442. Patented Feb. 18, 1862.
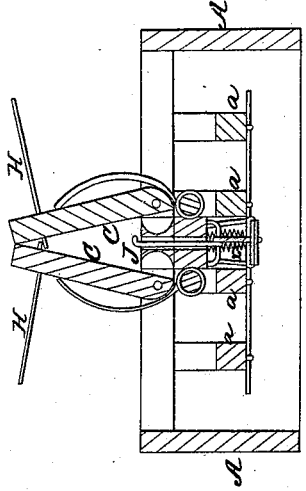
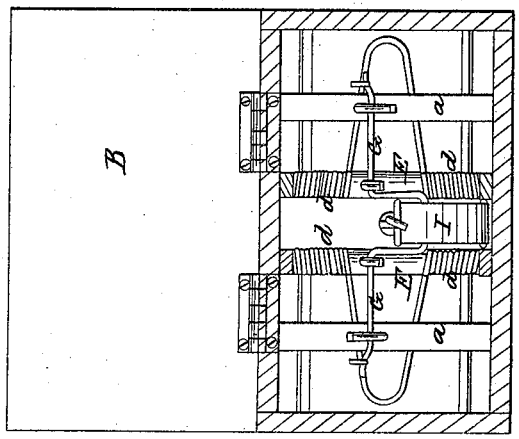
Witnesses.
C. M. Alexander
Charles Alexander
A. A. Yeatman
Inventor
C. R. Morehouse

UNITED STATES PATENT OFFICE.

CHARLES R. MOREHOUSE, OF CARDINGTON, OHIO.

IMPROVEMENT IN RAT-TRAPS.

Specification forming part of Letters Patent No. 34,442, dated February 18, 1862.

*To all whom it may concern:*

Be it known that I, CHARLES R. MOREHOUSE, of Cardington, in the county of Morrow and State of Ohio, have invented certain new and useful Improvements in Rat-Traps; and I do hereby declare that the following is a full, clear, and exact description of the same, reference being had to the accompanying drawings, and to the letters of reference marked thereon.

In the annexed drawings, making part of this specification, A represents a box in which the mechanism for operating the trap is secured. This box is constructed of any suitable size and is provided with a hinged bottom and also with a top which is hinged and divided into two parts near its center. On the inside of the box are bars $a\ a\ a$, to which a portion of the mechanism is secured.

E E represent two round bars around which the coiled springs $d\ d$ are wound. The ends of these springs $d\ d$ are secured near the ends of the bars E, and a portion of each spring at its center extends out from the bar in a bow form, as seen in Figure 1, and these bows press against the hinged top C C, pressing them up toward each other, as represented in Fig. 2.

G represents a crank-rod which is attached to the bars $a\ a\ a$ by staples. The crank in the rod is at its center, and under the crank is a wire spring $x$, which presses against it for the purpose of turning it.

I is a plate hinged at one end, which lies over the crank of rod G, upon which the end of trigger J catches for holding it down. The trigger J is a rod hinged at its center with one end bent to catch upon the plate I, then passing to the outside of the box between the doors C C is curved again for holding the bait.

The doors C C are provided with two bars H H, in which notches are cut to catch upon the ends of rod G.

The trap is set by catching the plate I under the end of the trigger and then pressing the tops C C down until the bars H H catch upon the ends of the rod G. The trap is then turned on its side and when the rat pulls at the bait the plate I is loosened, and the rod G being pushed or turned by the spring $x$ the bars H H are freed at the same instant, the doors being pressed together by springs $d\ d$. The rat is caught and killed between the doors by the concussion and the spikes in said doors.

Having thus fully described my invention, I claim—

1. The arrangement of the rod G, springs $d\ d$, plate I, and trigger J, as and for the purpose specified.

2. The arrangement of the doors C C, the bars H H, and the rod G, in the manner and for the purpose herein specified.

In witness that I claim the foregoing I have hereunto set my hand in the presence of two witnesses.

C. R. MOREHOUSE.

Witnesses:
W. H. GRANT,
I. C. GODMAN.